Figure 1:
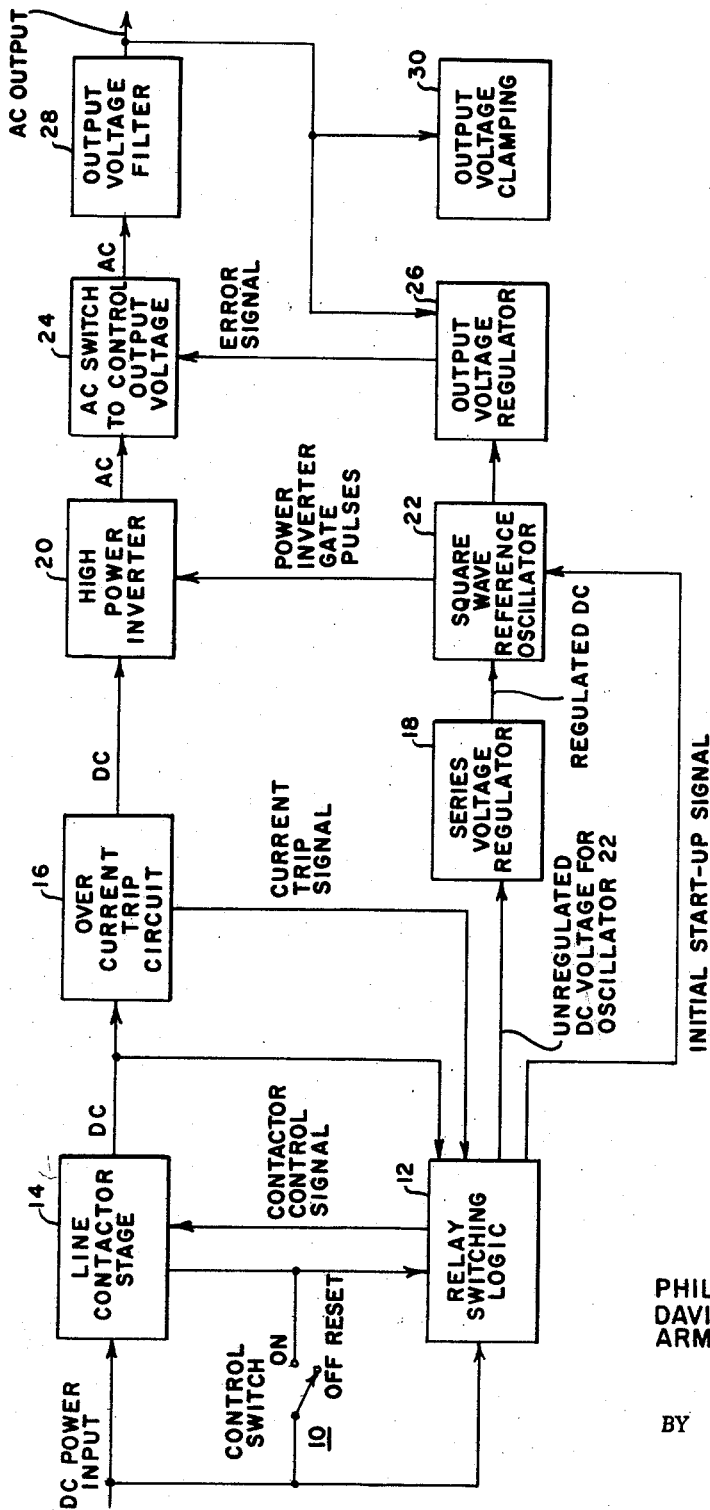

PHILIP D. COREY
DAVID L. PLETTE
ARMISTEAD L. WELLFORD
INVENTORS

BY

*Isidore Match*
ATTORNEY

PHILIP D. COREY
DAVID L. PLETTE
ARMISTEAD L. WELLFORD
INVENTORS

PHILIP D. COREY
DAVID L. PLETTE
ARMISTEAD L. WELLFORD
INVENTORS

BY

Isidore Match
ATTORNEY

United States Patent Office 3,124,740
Patented Mar. 10, 1964

3,124,740
INVERTER CIRCUIT UTILIZING SILICON CONTROLLED RECTIFIERS AND MODULATING THE OUTPUT WITH A DERIVED DIFFERENCE VOLTAGE
Philip D. Corey, David L. Plette, and Armistead L. Wellford, Waynesboro, Va., assignors to General Electric Company, a corporation of New York
Filed Mar. 16, 1961, Ser. No. 96,286
24 Claims. (Cl. 321—45)

This invention relates to inverters. More particularly, it relates to a system for providing an alternating current output having a selected frequency from a direct current power input thereto.

In situations where line A.C. power is not available, it is desired to have a system wherein direct current power can be converted to A.C. power. Such a system should be of relatively low weight, should contain a minimum amount of moving parts and substantially little or no maintenance thereof should be required.

Accordingly, it is an important object of this invention to provide a static inverter comprising elements which effect a weight reduction.

It is another object of this invention to provide a static inverter wherein there are contained very few moving parts and wherein the required maintenance is substantially rendered unnecessary.

Generally speaking and in accordance with the invention, there is provided a system for converting D.C. power from a source to A.C. power comprising means for generating an A.C. voltage in response to the application thereto of a voltage derived from the source and power switching means responsive to the application thereto of such A.C. voltage and the D.C. power to produce an A.C. power output. There is further included in the system a reference voltage and means for comparing the voltage of the A.C. power produced by the power switching means to produce an error voltage. Such error voltage is utilized to enable means for modulating the width of the half cycles of the A.C. power output from the power switching means whereby the voltage of the A.C. power output of the system is in accordance with the refernce voltage.

The features of this invention, which are believed to be new, are set forth with particularity in the appended claims. The invention itself, however, may best be understood by reference to the following description when taken in conjunction with the accompanying drawings which show an embodiment of an inverter system according to the invention.

In the drawings,

FIG. 1 is a block diagram of an inverter system according to the invention; and

Figure 2:
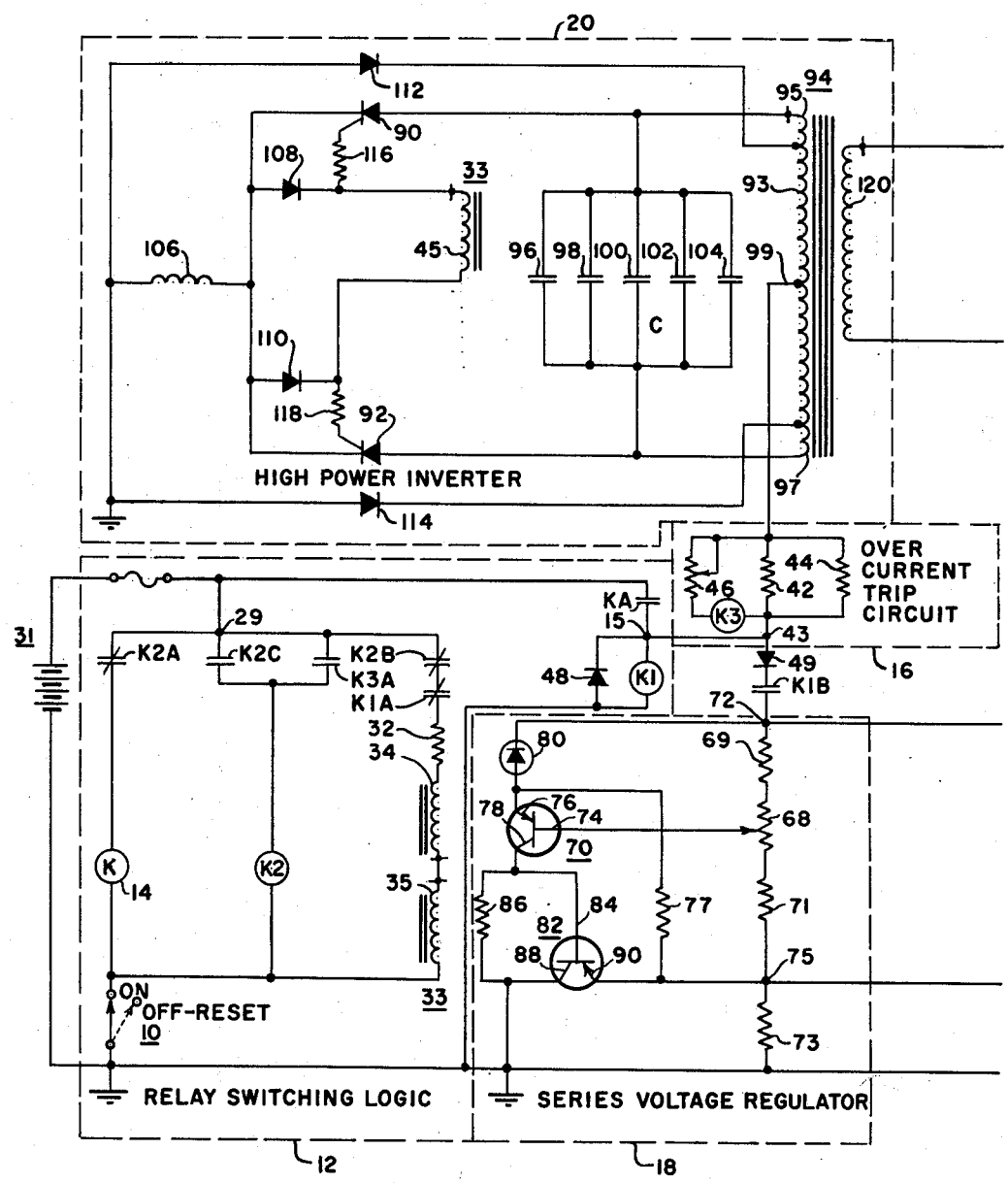
Figures 3, 4:
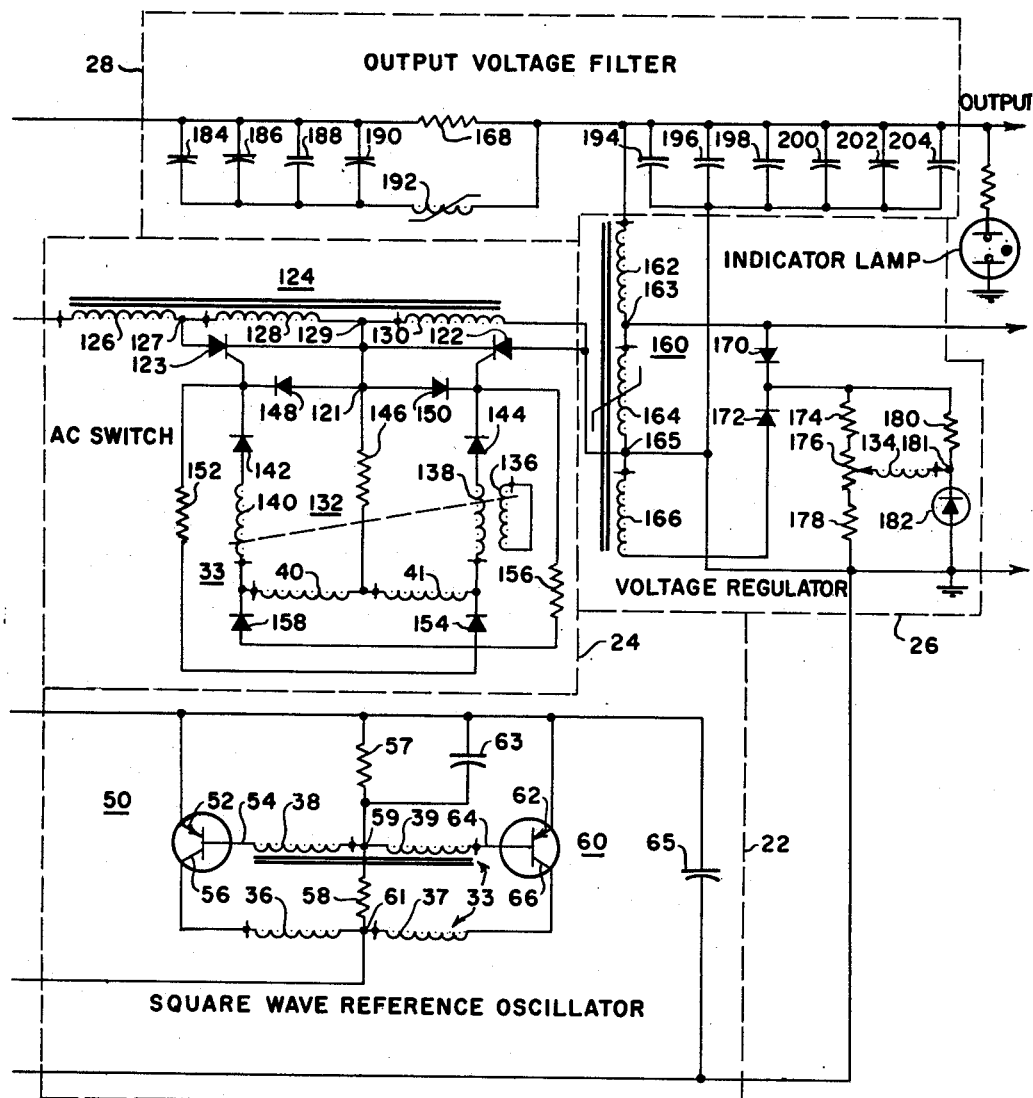

FIGS. 2 and 3 taken together as in FIG. 4 is a schematic depiction of the system shown in block form in FIG. 1.

Referring now to FIG. 1, when the control switch 10 is placed in the On position, the D.C. power input is applied to the system. Specifically, it is simultaneously applied to the relay switching logic stage 12 and line contactor stage 14. The output of the relay switching logic stage 12 at first is an initial start-up signal which is applied to a square wave reference oscillator 22 to preset the oscillator to an initial state. The line contactor stage 14 suitably contains a pair of contacts which assume the closed position when a relay associated therewith is energized by the application of the D.C. power. Line contactor stage 14 provides a D.C. output which is applied to the relay logic switching stage 12 whereby a relay in stage 12 is energized to actuate the system.

The D.C. power passes through the relay contained in line contactor stage 14 and is supplied to the system through an overcurrent trip circuit 16, the output of which is applied to the relay switching logic stage 12. Overcurrent trip circuit 16 is utilized to protect the system from malfunctions on start up and damage due to short circuits. In the event that such malfunction occurs, then relay switching logic stage 12 functions in response to the output of the overcurrent trip circuit 16 to deenergize the line contactor relay and thereby to disable system operation. The output of the relay switching logic stage 12 which is an unregulated D.C. voltage is applied to a voltage regulator 18, the ouput of which is regulated D.C. supply for square wave reference oscillator 22.

Square wave reference oscillator 22, which may suitably be a free runing multivibrator, a pulse generator or like circuit produces a square wave output having the frequency which is desired as the frequency of the A.C. output of the system. The output of reference oscillator 22 and the D.C. input are applied to a high power inverter stage 20 wherein there is produced in response thereto, an A.C. power output having the frequency of the output of square wave reference oscillator 22. The output from inverter stage 20 is fed to an A.C. switch stage 24 for controlling the voltage at the output terminals of inverter 20, such switch being enabled by gating pulses derived from the output of oscillator 22 and controlled in accordance with the output of an output voltage regulator 26.

Voltage regulator stage 26 may suitably include a reference element such as a Zener diode against which the amplitude of the output voltage from oscillator 22 is compared, the voltage resulting from such comparison determining the width of the gating pulses to A.C. switch 24.

A.C. switch stage 24 may suitably be a circuit for regulating the voltage of a wave by pulse width modulation, i.e., the amplitude of the output voltage from inverter stage 24 rises and falls in accordance with the amplitude of the input voltage applied thereto but due to the pulse width modulation in the A.C. switch stage 24, the R.M.S. voltage is maintained at a relatively constant potential.

The output from A.C. switch stage 24 is applied to an output voltage filter 28 to provide an A.C. output of the system which has the frequency of oscillator 22 and is approximately a true sine wave, filter stage 28 suitably being a low pass filter. It is seen that the output of the system is applied to voltage regulator stage 26. This output voltage is compared to the voltage across a reference element in the voltage regulator stage 26. The output voltage clamping circuit 30 may be included in the system and may suitably be a saturable transformer which saturates at overvoltages, the transformer thereby acting as an average voltage clamp to reduce the amplitude and duration of overvoltage transients.

Referring now to FIGS. 2–4 wherein there is shown a schematic depiction of a system such as is diagrammed in block form in FIG. 1, with the system control switch 10 placed in the On position, a circuit is completed from the positive terminal of D.C. source 31 through the normally closed contacts K2A associated with relay K2 and the line contactor relay K. to ground. Source 31 is the D.C. power source for the system from which the A.C. output is produced.

Simultaneously, a circuit is completed from the positive terminal of source 31 through the normally closed contacts K2B associated with relay K2, the normally closed contacts K1A associated with a relay K1, a resistor 32 and the windings 34 and 35 of a saturable transformer 33. Transformer 33 comprises two identical cores with winding 34 being around one of the cores and winding 35 being around the other. The cores are taped together with windings 34 and 35 thereon and primary windings 36 and 37 and secondary windings 38, 39, 40, 41, and 45 are wound around the taped combination. It is to be noted from the designated polarity dots in windings 34 and 35 respectively that the current flowing in the same direction through these windings orients the core material thereof in opposite directions. Such opposite orientation effectively presets the square wave oscillator 22 to an initial condition as will be further explained hereinbelow.

With regard to the use of the split core technique explained above to preset oscillator 22, it is to be realized that such split-core technique may be utilized in conjunction with any iron core magnetic device or magnetic device comprising a core of ferritic material. Examples of such devices are volt-second phase-shift reactors, magnetic amplifier reactors, output transformers, etc.

With the energization of relay K, normally open contacts KA, associated therewith close to permit the completion of a circuit from the positive terminal of source 31 through the now closed contacts KA, and the relay K1 to ground whereby relay K1 is energized and normally closed contacts K1A associated therewith assume the open position. With the energization of relay K1, a circuit can now be completed from the positive terminal of source 31 through contacts KA, the anode to cathode path of a diode 49 and the now closed contacts K1B associated with relay K1 to the emitters 52 and 62 of transistors 50 and 60 in the oscillator 22. It is now appreciated that for the conditioning of the system for normal operation, relay K1 forms a part of the relay switching logic stage 12.

Also, with the energization of relay K, a circuit is completed from the positive terminal of source 31 and through contacts KA to the overcurrent trip circuit 16. Circuit 16 comprises the parallel combination of a resistor 42, a resistor 44, and the series arrangement of a relay K3 and a variable resistor 46. If the current flowing through the current trip sensing circuit is at or below a desired level, relay K3 is not energized. However, if the current exceeds such level, relay K3 is energized whereby normally open contacts K3A associated therewith assume the closed position. In such situation, a circuit is completed from the positive terminal of potential source 31 through contacts K3A and relay K2 to ground whereby relay K2 is energized and normally open contacts K2C associated therewith assume the closed position. Thus, with relay K2 in the energized state, normally closed contacts K2A and normally closed contacts K2B associated therewith assume the open position whereby the line contactor relay K is removed from circuit together with potential source 31 to remove power from the system and relay K1 is also deenergized due to the opening of contacts KA. With this arrangement in the relay switching logic of the system, an over-current disables the system. Of course, the system can also be disabled by removing switch 10 from the On to the Off-Reset position to remove line contactor relay K from circuit together with potential source 31. Diode 48 is included in parallel with relay K1 to minimize arcing of the main contacts upon shutdown or current trip.

It is recalled that with the energization of relay K1 and the consequent closing of contacts K1B associated therewith, positive potential is applied to the emitters 52 and 62 of transistors 50 and 60 in multivibrator oscillator 22. Oscillator 22 is a free running square wave multivibrator in which the frequency is controlled by the saturation flux density of the core material of transformer 33.

In oscillator 22, the bases 54 and 64 respectively of transistors 50 and 60 are interconnected by secondary windings 38 and 39, the polarity dots on these windings indicating the direction of current flow to provide positive ampere turns therein. The collectors 56 and 66 of transistors 50 and 60 are interconnected by primary windings 36 and 37, the polarity dots indicated thereon showing the direction of current flow required to produce positive ampere turns therein. A resistor 58 is interposed between the junction 59 of windings 38 and 39 and the junction 61 of windings 36 and 37. Junction 59 is also connected to emitters 52 and 62 through the parallel combination of a resistor 57 and a capacitor 63. Emitters 52 and 62 are bypassed to ground through a capacitor 65 and junction 61 is connected to a point in voltage regulator 18 as will be further explained.

The square wave oscillator 22 comprising transistors 50 and 60, transformer 33 and other associated components is a magnetic coupled multivibrator utilizing a square loop core characteristic. This type multivibrator has a constant volt-second characteristic such that when constant voltage is applied thereto, a constant frequency output is produced therefrom.

In operation, transistors 50 and 60 alternately apply the regulated voltage from stage 18 to primary windings 36 and 37 of transformer 33. Upon the application of the D.C. regulator voltage from stage 18, the voltage divider comprising resistors 58 and 60 biases the base to emitter junctions of both transistors in such a direction as to render them both conducting. However, any small unbalance causes one transistor to become conductive before the other. If it is assumed that transistor 50 is rendered conductive first, the polarity of the winding 38 is such that when transistor 50 conducts, the positive voltage applied at the polarity dot terminal of winding 38 induces a negative voltage at base 54 with respect to junction 59 thereby increasing the conductivity in transistor 50 and holding it conductive until the transformer saturates a constant number of volts seconds later. While transistor 50 is biased in the conductive direction, it is to be noted that the reverse polarity occurring in winding 39 is biasing transistor 60 further in the non-conductive direction. When transformer 33 saturates after transistor 50 has been conductive, the base drive on transistor 50 collapses and transistor 60 immediately is rendered conductive. In this manner, transistor 60 supplies the other half cycle. Capacitor 63 serves to provide relatively rapid switching of conductivity in one transistor to the other thereby providing a sharp square wave. Capacitor 65 insures that at least the necessary voltage for the multivibrator is available even if the input momentarily falls below the approximate amount of volts needed for the operation of the multivibrator. Diode 49 insures that capacitor 65 is not discharged back into source 31 but that it is available to supply the multivibrator.

The voltage regulator stage 18 comprises transistors 70 and 82 and associated circuit components. In this circuit, transistor 70 comprises a base 74 connected by a tap to a variable resistor 68 which is part of a voltage divider connected between contacts K1B and ground, such divider also comprising a resistor 69, a resistor 71, and a resistor 73. The emitter 76 is connected to contacts K1B through the anode to cathode path of a Zener diode 80 and is also connected to the junction 75 of resistors 71 and 73 through a resistor 77. The collector 78 is connected to the base 84 of transistor 82 and is also connected to ground through a resistor 86.

In transistor 82, the collector 88 is connected to ground and the emitter 90 is connected to junction 75, the junction 75 being connected to junction 61 of windings 36 and 37 of transformer 33 in the oscillator stage 22.

In the operation of voltage regulator 18, the voltage divider comprising resistors 69, 68, and 71 provides an adjustable voltage which is proportional to the output of the voltage regulator. Voltage reference ("Zener") diode 80 maintains a fixed potential between the emitter 76 of transistor 70 and junction 72 which is the output junction of the voltage regulator.

Resistor 77 is a bleed resistor and insures that Zener diode 80 is operating in the desired range. Emitter 76 of transistor 70 is consequently maintained at a fixed potential with respect to junction 72 but the voltage at base 74 varies with the output of the regulator. If the regulator voltage tends to go up, the potential at the tap point on variable resistor 68 falls with respect to the voltage at junction point 72, i.e., goes more negative and thereby tends to increase conductivity in transistor 70. Consequently, the collector 78 current which flows through resistor 86 to ground is increased. Such increased current causes a raising of the voltage at base 84 of transistor 82, tending to drive transistor 82 further into nonconductivity thereby increasing the voltage thereacross. As a result, the voltage output of the regulator is decreased. Resistor 73 which is connected in shunt with transistor 82 serves to detour some of the load current around transistor 82 thereby reducing the resulting dissipation therein.

Since the operating frequency of oscillator 22 is proportional to the D.C. voltage applied thereto from voltage regulator stage 18, i.e., the higher the voltage the greater the frequency and vice versa, stage 18 serves to control the frequency accuracy of the output of oscillator 22.

As the voltage from source 31 is increased, the voltage regulator circuit functions to maintain an essentially constant voltage between junctions 72 and 75. In so functioning, more of the current flowing through regulator circuit 18 is detoured around transistor 82 and flows through resistor 73. Eventually, transistor 82 is rendered completely nonconductive and, thereafter, the increasing of the voltage of source 31 results in a proportional increase of the potential between junctions 72 and 75. Since the operating frequency of oscillator 22 is proportional to the D.C. voltage applied thereto from voltage regulator 18, the net result is that as the source 31 voltage is increased above the voltage level whereat transistor 82 is fully at cut off, the operating frequency of oscillator 22 is increased in proportion to the increase of the voltage of source 31. This mode of operation may be designated as "frequency takeover."

Such frequency takeover can be designed to occur whenever the voltage of source 31 exceeds normal operating limits. The effect of frequency takeover is to place a fixed limit on the maximum voltage for each half cycle which can be applied to the components in the power inverter 20, A.C. switch 24, voltage regulator 26 and output filter 28.

If the foregoing arrangement were not utilized, during overvoltages from source 31, transformer 94 would saturate, a condition which must be avoided. If it were attempted to avoid such a condition without the takeover action provided by the combination of regulator 18 and oscillator 22, the winding turnscore area product of transformer 94 would have to be much greater and, consequently, the transformer would have to be much heavier. Since weight is a very important factor, the frequency takeover accordingly effects considerable savings in weight if the inverter has to be designed to operate through input voltage transients.

It is to be noted that the combination of regulator 18 and oscillator 22 permits convenient temperature compensation to minimize drift of the frequency of oscillator 22.

The high power inverter stage 20 comprises silicon controlled rectifiers 90 and 92, transformer 94, the bank of capacitors 96, 98, 100, 102, and 104 connected in parallel and generally designated as C, inductor 106, diodes 108, 110, 112, and 114 and resistors 116 and 118.

In this circuit, the upper terminal 95 of the primary winding 93 of transformer 94 is connected to the anode of silicon controlled rectifier 90 and the lower terminal 97 of winding 93 is connected to the anode of silicon controlled rectifier 92, the mid-point 99 of primary winding 93 being connected to the current trip sensing circuit 16. A point near the upper terminal 95 of primary winding 93 is connected to ground through the cathode to anode path of diode 112 and a similarly located point near the lower terminal 97 of winding 93 is connected to the ground through the cathode to anode path of diode 114. The cathodes of silicon controlled rectifiers 90 and 92 are connected to ground through inductor 106. The upper terminal (polarity dot terminal) of winding 45 of transformer 33 is connected to the gate electrode of silicon controlled rectifier 90 through resistor 116 and to the cathode of silicon controlled rectifier 90 through the cathode to anode path of diode 108. The bottom terminal of winding 45 of transformer 33 is connected to the gate electrode of silicon controlled rectifier 92 through resistor 118 and to the cathode of silicon controlled rectifier 92 through the cathode to anode path of diode 110, inductor 106 being connected between ground and the anodes of diodes 108 and 110, respectively.

In the operation of the high power inverter stage 20, with the appearance of a positive pulse in winding 45 of transformer 33, silicon controlled rectifier 90 is switched into conduction and essentially the voltage of source 31 appears across that portion of primary winding 93 between terminal 95 and mid-point 99. Due to autotransformer action, the bank of capacitors C charges to a voltage substantially equal to twice the voltage of source 31 at a very rapid rate. Such situation persists for the duration of one half cycle of oscillator 22, at which time the next half cycle in stage 20 is initiated by the triggering into conduction of silicon controlled rectifier 92. At the initiating of the second half cycle, i.e., when a positive pulse appears at the gate electrode of silicon controlled rectifier 92, the bank of capacitors C is essentially connected across silicon controlled rectifier 90 in the reverse polarity thereby quickly causing silicon controlled rectifier 90 to cease conducting and to recover its blocking state. The bank of capacitors C now becomes charged to twice the voltage of source 31 in the reverse polarity at a rate which is determined partly by the load current flowing and partly by the series resonant combination of inductor 106 and the bank of capacitors C. Conduction continues in silicon controlled rectifier 92 and the opposite polarity one half cycle of output is obtained from transformer 94 across secondary winding 120. Rectifiers 112 and 114 are included to permit return of energy to the source under conditions such as those of lagging power factor loads.

The output of transformer 94 is essentially a square wave of constant frequency; the amplitude of such wave is roughly proportional to the applied D.C. voltage. As has been described, the gating of silicon controlled rectifiers 90 and 92 is accomplished directly by winding 45 which is wound on transformer 33.

If it is assumed that the polarity of transformer 33 is such that the polarity dot terminal of winding 45 is positive with respect to the other terminal of winding 45, current flows through gate limiting resistor 116, into the gate lead and out of the cathode of silicon controlled rectifier 90, through diode 110, and back to the other terminal of winding 45. The current flowing through diode 110 actually back biases the gate electrode of silicon controlled rectifier 92 thereby insuring that silicon controlled rectifier 92 is not falsely triggered. When the polarity of transformer 33 is reversed, the current is reversed and flows through resistor 118, the gate electrode and the cathode of silicon controlled rectifier 92 and diode 108 thereby back-biasing silicon controlled rectifier 90.

It has been stated above that initially when line contactor relay K was first energized the cores of transformer 33 were respectively orientated in opposite directions. It is understood that whichever transistor, 50 or 60, is energized into conduction first determines the polarity of the first output pulse of oscillator 22. However, regardless of polarity, the duration of the first output pulse is only 90 electrical degrees due to the fact that one of the cores is already at saturation. In effect, therefore, one half of the magnetic circuit is not present during the first half cycle and therefore the duration of the first half cycle is only 90 electrical degrees. Each subsequent half cycle is a normal 180 electrical degrees.

The significance of initially orienting the cores of saturable autotransformer 33 in opposite directions of orientation when power is first applied to the system (windings 34 and 35) can now be appreciated. Transformer 94 of high power inverter stage 20 represents almost 20 percent of the total inverter weight. For this reason, it is desirable to minimize the needed NA, or product of winding turns times effective iron area in the transformer. Transformer 94 is suitably designed with a small air gap, and therefore, the flux state thereof at the start of the initial cycle of operation is close to zero. If the first half cycle is only a quarter cycle long, i.e., 90 electrical degrees, then the flux in transformer 94 reaches a maximum flux density condition, say state B. If the next half cycle thereafter is normal, the flux is switched to the state —B. With succeeding half cycles, the flux continues to swing between states —B and +B, etc., and not from zero to 2B as in the case of an ordinary circuit. For this reason, it is highly desirable to have the first half cycle of operation only one quarter of a cycle long, such being accomplished as previously explained. Since on the first half cycle, regardless of which transistor first conducts in oscillator 22, one core of saturable transformer 33 is already saturated, the effective iron area is cut in half. This results in the desired quarter cycle on start up. After completion of the first shortened half cycle, oscillator 22 operates normally.

Initially, closure of contacts KA supplies D.C. power to junction point 15. This supplies voltage to transformer 94. However, transformer 94 is not actuated since no trigger or gating signals are present on either of the silicon controlled rectifiers 90 and 92. The energization of relay K1 removes the setting signal from windings 34 and 35 of transformer 33 due to the consequent opening of contacts K1A and then power is applied through diode 49 to series voltage regulator 18 and thence to oscillator 22. Capacitor 65 insures the operation of the multivibrator oscillator during voltage dips and also insures proper operation if the normally open contacts K1B tend to bounce upon "make."

If this arrangement were not utilized, the flux in transformer 94 would swing from state 0 to state 2B and transformer 94 might saturate, as has been explained hereinabove. Such condition has to be avoided. Thus, if it were attempted to avoid such condition without the two core arrangement of transformer 33 of this invention, the NA product of transformer 94 would have to be much greater and consequently the transformer would have to be much heavier. Since weight is an important factor, the arrangement in transformer 33 of two cores initially saturated in opposite directions to insure that the first cycle is only 90 electrical degrees accordingly effects a great saving of weight.

Referring back to the relay logic stage 12, if for some reason the A.C. output of the inverter were overloaded, or some malfunction occurred in the inverter itself, the input direct current to transformer 94 might rise above a normal operating value. Most of such current passes through the shunt comprising the two parallel connected resistors 42 and 44. In the event of an overcurrent, the voltage developed across the shunt is sufficient to energize relay K3. Variable resistor 46 is a sensitivity adjustment which determines how much direct current is required to cause current trip, i.e., the energization of relay K3. Contacts K3A associated with relay K3 are connected from the positive terminal of source 31 through junction 29 and through control switch 10 to relay K2. Thus, on current trip, relay K2 is energized and is sealed by a pair of its own normally open contacts K2C. The energization of relay K2 in turn causes the opening of normally closed contacts K2A in series arrangement with line contactor relay K and relay K is consequently deenergized. Relay K2 remains in the energized state and therefore prevents cycling of the fault which caused its energization. To reset the system, after it is tripped by an overcurrent condition, it is only necessary to place control switch 10 in the Off-Reset position. This causes relay K2 to be deenergized and then the system operation can be reinitiated by placing the control switch 10 in the On position. As has been mentioned above, diode 48 is utilized to minimize arcing of contacts upon normal shut down or current trip.

In the A.C. switch stage 24, voltage regulation is obtained by the use of a series A.C. switch comprising silicon controlled rectifiers 123 and 122, and an autotransformer 124. This switch varies the output voltage of the system by varying the width of the conducting pulse, i.e., it performs pulse width modulation. Transformer 124 which is suitably an autotransformer is utilized to change the impedance level of A.C. switch 24, so that lower voltages and higher currents which match the silicon controlled rectifier characteristics are present. It is seen that a transformer such as transformer 124 may be utilized similarly in the control of any alternating current system.

In A.C. switch stage 24, the potential appearing at the lower terminal of the secondary winding 120 of transformer 94 is applied to one terminal of autotransformer 124, the latter comprising windings 126, 128, and 130. The junction 127 of windings 126 and 128 is connected to the anode of silicon controlled rectifier 123, the junction 129 of windings 128 and 130 is connected to the cathodes of silicon controlled rectifiers 123 and 122 and the other terminal of winding 130 is connected to the anode of silicon controlled rectifier 122 and to ground.

One terminal of winding 40 (the polarity dot terminal) of transformer 33 is connected to the gate electrode of silicon controlled rectifier 123 through a gate winding 140 of a magnetic amplifier 132 and the anode to cathode path of a diode 142. A terminal of winding 41 is connected to the gate electrode of silicon controlled rectifier 122 through a gate winding 138 of magnetic amplifier 132 and the anode to cathode path of a diode 144. The junction of windings 40 and 41 of transformer 33 is connected to the junction 121 of the cathodes of silicon controlled rectifiers 123 and 122 through a resistor 146, the anode to cathode path of a diode 148 being connected between junction 121 and the gate electrode of silicon controlled rectifier 123, and the anode to cathode path of a diode 150 being connected between junction 121 and the gate electrode of silicon controlled rectifier 122. Winding 136 is a shorted control winding of magnetic amplifier 132. Connected between the gate electrode of silicon controlled rectifier 123 and the undotted terminal of winding 41 is a resistor 152 and the anode to cathode path of a diode 154 and connected between the gate electrode of silicon controlled rectifier 122 and the dot terminal of winding 40 is a resistor 156 and the anode to cathode path of a diode 158.

Associated with A.C. switch stage 24 is output voltage regulator stage 26. This stage comprises a saturable autotransformer 160 comprising windings 162, 164, and 166, one terminal of transformer 160 being connected to the upper terminal of secondary winding 120 of transformer 94 through a resistor 168. Connected between the junction 163 of windings 162 and 164 of transformer 160 and the lower terminal of winding 166 are a pair of series connected back to back diodes 170 and 172, the anode of diode 170 being connected to junction 163, the anode of diode 172 being connected to the lower terminal of winding 166.

Connected between the junction of the cathodes of diodes 170 and 172 and the junction 165 of windings 164 and 166, i.e., ground, is a voltage divider network comprising a series arrangement of a resistor 174, a variable resistor 176 and a resistor 178. Connected in shunt with the voltage divider is a series arrangement of a resistor 180 and the cathode to anode path of a Zener diode 182. The control winding 134 of magnetic amplifier 132 is connected between the junction 181 of resistor 180 and Zener diode 182 and a tap on a point on resistor 176.

In the operation of the A.C. switch stage 24 and the output voltage regulator stage 26, the conduction times of silicon controlled rectifiers 123 and 122 are respectively controlled by the firing pulses produced from the magnetic amplifier 132. The conduction period of magnetic amplifier 132 is in turn varied by the voltage which appears across control winding 134 thereof.

It is to be noted that the voltage developed across Zener diode 182 is not purely a direct current voltage but is a direct current voltage with a small slice taken out of it each half cycle due to the nature of the voltage waveform applied. With such arrangement, there is desirably regulated substantially the R.M.S. output voltage rather than the average voltage. Voltage adjustment is accomplished with variable resistor 176.

The functions of transformer 160 are to supply a chosen voltage output at junction 163 which is a fraction of the total voltage output of the system, and to provide a suitable means for full wave center tap sensing as applied to diodes 170 and 172. Also, under transient high voltage conditions, transformer 160 saturates thereby limiting the average output voltage and causing such voltage to return to its normal level faster than it would normally so do, thereby providing voltage clamping action.

The additional winding 136 of magnetic amplifier 132 is included as a shorted control winding. Such winding serves the dual function of slowing the operation of magnetic amplifier 132 and of filtering the voltage sensed on control winding 134 whereby there is provided a well damped voltage regulator response to transients. The supply voltage to magnetic amplifier 132 is obtained directly from square wave oscillator 22 through secondary windings 40 and 41 of transformer 33.

As an example of operation of the A.C. switch stage, if it is assumed that the voltage at the terminal of winding 40 connected to the cathode of diode 158 is positive with respect to the voltage at the terminal of winding 41 connected to the cathode of diode 154 but that no pulse has appeared therein for the switching into conductivity of silicon controlled rectifier 123, current can flow through resistor 146, diode 148, resistor 152, diode 154 and back to the terminal of winding 41 of transformer 33. The current flowing through diode 148 back biases the gate electrode of silicon controlled rectifier 123 during this critical interval when forward voltage has to be blocked. Once the gate winding 140 of magnetic amplifier 132 saturates, gating current flows from the dot terminal of winding 40 through gate winding 140, diode 142 into the gate electrode of silicon controlled rectifier 123, out of its cathode and back through resistor 146 to the junction of secondary windings 40 and 41 of transformer 33. Resistor 146 is a gate current limiting resistor for both silicon controlled rectifiers 123 and 122. On the other half cycle, the circuit operation is exactly symmetrical, in providing reverse bias and then gating at the proper time.

Autotransformer 160 as has been explained hereinabove is chosen to be of the saturable type so that it saturates at overvoltages. In this manner, therefore, it functions as an average voltage clamp thereby reducing the amplitude and duration of overvoltage transients. This clamping action is represented by the output voltage clamping stage 30 in FIG. 1.

The output voltage filter stage 28 comprises a bank of parallel connected capacitors 184, 186, 188, and 190 and a saturable inductor 192 connected in series with the load current and a bank of parallel connected capacitors 194, 196, 198, 200, 202, and 204 connected in parallel with the load, the latter bank of capacitors having one terminal connected to ground. The series combination comprising the bank of capacitors 184, 186, 188, and 190, and inductor 192 is tuned to series resonance at the frequency of the output of oscillator 22, i.e., the desired fundamental output frequency. Inductor 192 is, however, a high impedance to higher harmonics as compared to the impedance presented by the series connected bank of capacitors and the parallel connected bank of capacitors and therefore has most of the harmonics dropped across it. The parallel connected bank of capacitors also supplies energy to the output during portions of the cycle when A.C. switch stage 24 is not enabled. Resistor 168 is connected across the series LC combination for transient voltage suppression.

Inductor 192 also provides a form of current limiting. If the current therethrough exceeds a certain value, inductor 192 saturates on each half cycle thereby detuning the LC circuit comprising the series connected bank of capacitors and inductor 192 and thus dropping much of the fundamental, i.e., the desired output across it.

While there have been described what are considered to be the preferred embodiments of this invention, it will be obvious to those skilled in the art that various changes and modifications may be made therein without departing from the invention and it is, therefore, aimed in the appended claims to cover all such changes and modifications as fall within the spirit and scope of the invention.

What is claimed as new and desired to be secured by Letters Patent of the United States is:

1. A system for converting D.C. power from a source to A.C. power comprising means adapted to be coupled to the source for generating an A.C. voltage in response to the application thereto of a D.C. voltage derived from the source, power switching means responsive to the application thereto of said A.C. voltage and said D.C. power for producing an A.C. power output having the frequency of said A.C. voltage, a reference voltage, comparing means in circuit with said reference voltage and responsive to the application thereto of the voltage of said A.C. power output for producing an error voltage indicative of a deviation of said last-named voltage from said reference voltage, and means for modulating said A.C. power output with said error voltage to regulate the voltage of said A.C. power output.

2. A system for converting D.C. power from a source to A.C. power comprising means adapted to be coupled to the source for generating an A.C. voltage in response to the application thereto of a D.C. voltage derived from the source, power switching means responsive to the application thereto of said A.C. voltage and said D.C. power for producing an A.C. power output having the frequency of said A.C. voltage, means for deriving a reference unidirectional voltage of a chosen value from said A.C. power output, means in circuit with said unidirectional potential and responsive to the application thereto of said A.C. power output for comparing the voltage of said A.C. power output with said reference voltage, and means in circuit with said power switching means and said comparing means for modulating said A.C. power output with the difference voltage produced by said comparing means to regulate the voltage of said A.C. power output.

3. A system for converting D.C. power from a source to A.C. power comprising means adapted to be coupled to the source for generating an A.C. voltage in response to the application thereto of a D.C. voltage derived from the source, means adapted to be connected in circuit with the source and in circuit with said generating means for regulating said derived voltage, power switching means responsive to the application thereto of said A.C. voltage and said D.C. power for producing an A.C. power output having the frequency of said A.C. voltage, means for deriving a reference unidirectional voltage of a chosen value from said A.C. power output, means in circuit with said reference voltage and responsive to the application thereto of said A.C. power output for comparing the voltage of said A.C. power output and said reference voltage, and means in circuit with said power switching means and said comparing means for modulating said A.C. power output with the difference voltage produced by said comparing means to regulate the voltage of said A.C. power output.

4. A system for converting D.C. power from a source to A.C. power comprising means adapted to be coupled to the source for generating an A.C. voltage in response to the application thereto of a D.C. voltage derived from the source, means adapted to be connected in circuit with the source and in circuit with said generating means for regulating said derived voltage, power switching means responsive to the application thereto of said A.C. voltage and said D.C. power for producing an A.C. power output having the frequency of said A.C. voltage, means adapted to be connected in circuit with the source and said power switching means for preventing the application of said D.C. power to said switching means in response to a current from said source which exceeds a selected value, means responsive to said A.C. power output for deriving a reference unidirectional voltage of a chosen value from said A.C. power output, means in circuit with said reference voltage and responsive to the application thereto of said A.C. power output for comparing the voltage of said A.C. power output and said reference voltage, and means in circuit with said power switching means and said comparing means for modulating said A.C. power output with the difference voltage produced by said comparing means to regulate the voltage of said A.C. power output.

5. A system for converting D.C. power from a source to A.C. power comprising means adapted to be coupled to the source for generating a square wave voltage having an amplitude less than a selected level in response to the application thereto of a D.C. voltage derived from the source, means adapted to be connected in circuit with the source and said generating means for regulating said derived voltage at a prescribed level, power switching means responsive to the application thereto of said square wave and said D.C. power for producing a square wave power output having the frequency of said square wave voltage, means adapted to be connected in circuit with the source and in circuit with said power switching means and said generating means and said regulating means for preventing the application of said D.C. power in response to current from the source which exceeds a selected value, means responsive to the application thereto of said power output for deriving a reference unidirectional voltage of a chosen value, means in circuit with said reference voltage and responsive to the application thereto of said output for comparing the voltage of said output with said reference voltage, means in circuit with the outputs of said power switching means and said comparing means for modulating said power output with the difference voltage produced by said comparing means to regulate the voltage of said power output and filter means responsive to the application thereto of said power output for converting said output to a sinusoidal wave.

6. The system defined in claim 5 wherein said generating means produces a square wave voltage having a frequency which is proportional to the amplitude of a D.C. voltage applied thereto and wherein said derived voltage regulating means includes means responsive to a voltage from the source which exceeds a chosen level for effecting the application to said generating means of a voltage exceeding said prescribed level, whereby the frequency of the output of the said generating means is increased.

7. A system for converting D.C. power from a source to A.C. power comprising means adapted to be coupled to the source for generating a square wave voltage having an amplitude less than a selected level in response to the application thereto of a D.C. voltage derived from the source, the frequency of the output of said generating means being proportional to the derived voltage applied thereto, means adapted to be connected in circuit with the source and in circuit with said generating means for regulating said derived voltage at a prescribed level, said regulating means including means responsive to a voltage from the source which exceeds a chosen level for effecting the application to said generating means of a voltage exceeding said prescribed level, whereby the frequency of the output of said generating means is increased, power switching means responsive to the application thereto of said square wave and said D.C. power for producing a square wave power output having the frequency of said square wave voltage, means adapted to be connected in circuit with the source and in circuit with said power switching means and said generating means and said regulating means for preventing the application of said D.C. power in response to current from the source which exceeds a selected value, filter means responsive to the application thereto of said power output for converting said output to a sinusoidal wave, means responsive to the application thereto of said filtered output for deriving a reference unidirectional voltage of a chosen value, means in circuit with said reference voltage and responsive to the application thereto of said filtered output for comparing the voltage of said filtered output with said reference voltage, and means in circuit with said generating means and said comparing means for modulating the output of said power switching means with the difference voltage produced by said comparing means to regulate the voltage of said power output.

8. A system for converting D.C. power from a source to A.C. power comprising means adapted to be coupled to the source for generating a square wave voltage having an amplitude not exceeding a selected level in response to the application thereto of a D.C. voltage of a prescribed level derived from said source, the frequency of the generating means being in accordance with the amplitude of said derived voltage, means adapted to be connected in circuit with the source and in circuit with said generating means for regulating said derived voltage, said regulating means including means responsive to a voltage from the source which exceeds a chosen level for effecting the application to said generating means of a voltage exceeding said prescribed level whereby the frequency of the output of said generating means is increased, power switching means responsive to the application thereto of said square wave and said D.C. power for producing a square wave power output having the frequency of said square wave voltage, means adapted to be connected in circuit with the source and in circuit with said power switching means and said generating means and said regulating means for preventing the application of said D.C. power in response to current from the source which exceeds a selected value, filter means responsive to the application thereto of said power output for converting said output to a sinusoidal wave, means responsive to the application thereto of said filtered output for deriving a reference unidirectional voltage of a chosen value, means in circuit with said reference voltage and responsive to the application thereto of said filtered output for comparing the voltage of said filtered output with said reference voltage, and means in circuit with said generating means and said comparing means for modulating the output of said power switching means with a difference voltage produced by said comparing means to regulate the voltage of said power output.

9. A system for converting D.C. power from a source to A.C. power comprising means adapted to be coupled to the source for generating a square wave voltage having an amplitude not exceeding a selected level in response to the application thereto of a D.C. voltage of a prescribed level derived from the source, the frequency of the output of said generating means being proportional to the amplitude of said derived voltage, means adapted to be connected in circuit with the source and in circuit with said generating means for regulating said derived voltage, said regulating means including means responsive to a voltage from the source which exceeds a chosen level for effecting the application to said generating means of a voltage exceeding said prescribed level whereby the frequency of the output of said generating means is increased, power switching means responsive to the application thereto of said square wave and said D.C. power for producing a square wave power output having the frequency of said square wave voltage, means adapted to be connected in circuit with the source and in circuit with said power switching means and said generating means and said regulating means for preventing the application of said D.C. power in response to current from the source which exceeds a selected value, filter means responsive to the application thereto of said power output for converting said output to a sinusoidal wave, said filter means including means for limiting the current in said output, means responsive to the application thereto of said filtered output for deriving a reference unidirectional voltage of a chosen value, means in circuit with said reference voltage and responsive to the application thereto of said filtered output for comparing the voltage of said filtered output with said reference voltage, and means in circuit with said generating means and said comparing means for modulating the output of said power switching means with the difference voltage produced by said comparing means to regulate the voltage of said power output.

10. A system for converting D.C. power from a source to A.C. power comprising means adapted to be coupled to the source for generating a square wave voltage having an amplitude not exceeding a selected level in response to the application thereto of a D.C. voltage of a prescribed level derived from the source, the output frequency of said generating means being proportional to the amplitude of said derived voltage, means adapted to be connected in circuit with the source and in circuit with said generating means for regulating said derived voltage, said regulating means including means responsive to a voltage from the source which exceeds a chosen level for effecting the application to said generating means of a voltage exceeding said prescribed level whereby the frequency of the output of said generating means is increased, power switching means responsive to the application thereto of said square wave voltage and said D.C. power for producing a square wave power output having the frequency of said square wave voltage, means adapted to be connected in circuit with the source and in circuit with said power switching means and said generating means and said regulating means for preventing the application of said D.C. power in response to current from the source which exceeds a selected value, filter means responsive to the application thereto of said power output for converting said output to a sinusoidal wave, said filter means including means for limiting the current of said output, means responsive to the application thereto of said filtered ouput for deriving a reference unidirectional voltage of a chosen value, said reference voltage being derived from a voltage proportional to the root mean square of the voltage of said output, means in circuit with said reference voltage and responsive to the application thereto of said filtered output for comparing the voltage of said filtered output with said reference voltage, and means in circuit with said generating means and said comparing means for modulating the output of said power switching means with the difference voltage produced by said comparing means to substantially regulate the root mean square of the voltage of said power output.

11. A system for converting D.C. power from a source to A.C. power comprising means adapted to be coupled to the source for generating a square wave voltage having an amplitude not exceeding a selected level in response to the application thereto of a voltage of a prescribed level derived from the source, the frequency of the output of said generating means being proportional to the amplitude of said derived voltage, means adapted to be connected in circuit with the source and in circuit with said generating means for regulating said derived voltage, said regulating means including means responsive to a voltage from the source which exceeds a chosen level for effecting the application to said generating means of a voltage exceeding said prescribed level whereby the frequency of the output of said generating means is increased, power switching means responsive to the application thereto of said square wave voltage and said D.C. power for producing a square wave power output, means adapted to be connected in circuit with the source and in circuit with said power switching means and said generating means and said regulating means for preventing the application of said D.C. power in response to current from the source which exceeds a selected value, filter means responsive to the application thereto of said power output for converting said output to a sinusoidal wave, said filter means including means for limiting the current in said output, means responsive to the application thereto of said filtered output for deriving a reference unidirectional voltage of a chosen value which is proportional to the root mean square of said output voltage, means in circuit with said reference voltage and responsive to the application thereto of said filtered output for comparing the voltage of said filtered output with said reference voltage, means in circuit with said generating means and said comparing means for modulating the widths of the half cycles of output from said power switching means with the difference voltage produced by said comparing means to regulate the voltage of said power output, and means in circuit with said filter means for clamping the voltage of said output to a given level.

12. The system defined in claim 11 wherein said generating means comprises a magnetic coupled type multivibrator, said multivibrator having a constant volt-second characteristic whereby a constant voltage applied thereto produces a constant frequency output therefrom.

13. The system defined in claim 12 wherein said multivibrator is magnetically coupled by a saturable transformer comprising a pair of identical cores, a first winding around a first core, a second winding around a second core, a primary winding around the combination of both cores and a plurality of secondary windings around the combination of both cores, said transformer being coupled to said regulating means and said power switching means, said system further including means for initially orientating the flux in said respective cores in opposite directions whereby the initial pulse output of said multivibrator is only 90 electrical degrees, the remaining output half cycles thereafter being 180 electrical degrees.

14. The system defined in claim 13 wherein said means for regulating said derived voltage includes means for adjusting the amplitude of said derived voltage to enable the varying of the output frequency of said multivibrator.

15. The system defined in claim 14 wherein said means responsive to a voltage from said source which exceeds a chosen level includes means for modifying the operation of said derived voltage regulating means in response to said excessive voltage.

16. The system defined in claim 15 wherein said power switching means includes an output transformer whose flux state is substantially zero initially whereby the initial ninety degree pulse output from said multivibrator prevents saturation of the core material of said transformer during the operation thereof.

17. The system defined in claim 16 wherein said power switching means is actuated by the pulses appearing in a first plurality of the secondary windings of said multivibrator transformer and wherein said modulating means is actuated by the pulses appearing in a second plurality of the secondary windings of said multivibrator transformer.

18. The system defined in claim 17 wherein said modulating means includes a magnetic amplifier comprising a control winding and a plurality of gate windings, said pulses in said second plurality of secondary windings being applied respectively to said gate windings, said difference voltage being applied to said control winding.

19. The system defined in claim 18 wherein said magnetic amplifier includes a second shorted control winding for retarding the action of said magnetic amplifier and for filtering said difference voltage to provide a damped voltage regulator response to transients.

20. The system defined in claim 19 wherein said power switching means includes a first plurality of silicon controlled rectifiers, each comprising an anode, a cathode and a gate electrode and wherein pulses from said first plurality of secondary windings are applied to the gate electrodes of said silicon controlled rectifiers, said D.C. power being applied to the anodes of said silicon controlled rectifiers.

21. The system defined in claim 20 wherein said modulating means includes a second plurality of silicon controlled rectifiers respectively having an anode connected to the transformer of said power switching means, said pulses in said second plurality of secondary windings being applied through the gate electrodes of said silicon controlled rectifiers through the respective gate windings of said magnetic amplifier.

22. The system defined in claim 21 wherein an autotransformer is provided to connect the transformer of said power switching means with the silicon controlled rectifiers in said modulating means whereby the impedance level of operation of said silicon controlled rectifiers is altered.

23. The system defined in claim 11 wherein said voltage clamping means comprises a saturable transformer, said voltage clamping occurring at the level of saturation of said transformer.

24. The system defined in claim 11 wherein said filter means comprises a series tuned LC circuit tuned to the frequency of the output of said generating means, the inductor of said LC circuit being saturable to provide current limiting when the current therethrough exceeds a given value, the saturation of said inductor detuning said LC circuit, said filter further including a parallel connected capacitance for supplying energy to said output when no output is provided from said modulating means.

References Cited in the file of this patent

UNITED STATES PATENTS

| | | |
|---|---|---|
| 2,505,620 | John et al. | Apr. 25, 1950 |
| 3,027,508 | Johnson | Mar. 27, 1962 |